US006047979A

United States Patent [19]

Kraft et al.

[11] Patent Number: 6,047,979

[45] Date of Patent: Apr. 11, 2000

[54] WHEELCHAIR ANTI-TIPPING DEVICE

[75] Inventors: Laura Kraft; Emerson Gallagher; Janice Blok; Doug Manarin, all of Vancouver, Canada

[73] Assignee: Geer Products Ltd., Vancouver, Canada

[21] Appl. No.: 09/054,269

[22] Filed: Apr. 3, 1998

[51] Int. Cl.[7] ...................... B62M 1/14

[52] U.S. Cl. ...................... 280/250.1; 297/209

[58] Field of Search ...................... 280/5.2, 5.32, 280/242.1, 250, 282, 293, 657, DIG. 10

[56] References Cited

U.S. PATENT DOCUMENTS

| | | | |
|---|---|---|---|
| 3,573,877 | 4/1971 | Locke | 280/5.32 |
| 3,580,591 | 5/1971 | Coffey | 280/5.32 |
| 3,848,883 | 11/1974 | Breacain | 280/5.32 |
| 4,125,269 | 11/1978 | Kiel | 280/30 |
| 4,310,167 | 1/1982 | McLaurin | 280/5.28 |
| 4,565,385 | 1/1986 | Morford | 280/289 |
| 4,995,628 | 2/1991 | Orpwood | 280/304.1 |
| 5,181,733 | 1/1993 | Tague | 280/304 |
| 5,531,284 | 7/1996 | Okamoto | 180/65.1 |

*Primary Examiner*—Christopher P. Schwartz
*Assistant Examiner*—C. T. Bartz

[57] ABSTRACT

A wheelchair has a pair of wheels supporting a frame, a pair of front castors, a seat, and an anti-tipping device on the frame. The anti-tipping device includes an extensible and retractable displacement mechanism including an actuating member manually accessible by a person seated on the seat for displacing a ground engagement member between a forwardly retracted inoperative position, in which the ground engagement member is retracted beneath the seat, and a rearwardly extended operative or deployed position, in which the ground engagement member is extended rearwardly from the frame.

8 Claims, 9 Drawing Sheets

WHEELCHAIR ANTI-TIPPING DEVICE

BACKGROUND OF THE INVENTION

1. Field of the Invention

The present invention relates to wheelchairs and, more particularly, to wheelchairs provided with anti-tipping devices for preventing the wheelchairs from tipping over rearwardly.

2. Description of the Related Art

A conventional wheelchair comprises a seat on a frame, a pair of side wheels supporting the frame and, forwardly from the side wheels, a pair of front castors.

Various anti-tipping devices have, in the past, been proposed for counteracting the problem that, when the chair is required to move forwardly over an obstruction, for example over a curb of a sidewalk, the front castors must be raised by a certain amount, which inevitably tilts the wheelchair backward by a corresponding amount, and there is therefore a risk that the rearward tilting of the wheelchair and its occupant may cause their joint centre of gravity to be displaced rearwardly to such an extent that the wheelchair and its occupant fall backwardly.

For example, in U.S. Pat. No. 3,848,883, issued Nov. 19, 1974, to Stephen J. Breacain, there is disclosed an anti-tip apparatus for a wheelchair which includes a main tube extending laterally and rearwardly from the rear frame upright of a wheelchair, with extension tubes slidably received in the main tubes and spring-biased to a retracted position. The extended ends of the extension tubes are joined by a transverse support tube, and a wheel or coaster is provided at the end of each extension tube. A manually releasible spring detent latch on each main tube holds the apparatus in the extended position, allowing the wheelchair occupant safely to tip the chair back onto the extended wheel or coaster to negotiate steps and curbs and to retract the apparatus when maneuvering in close quarters. However, the latch is located behind the wheelchair seat, in a position in which the latch is not accessible to the occupant of the seat. There is no mechanism which can be operated by the occupant, while seated in the seat, for extending and retracting the wheel or coaster.

U.S. Pat. No. 3,580,591, issued May 25, 1971, to H. Franklin Coffey et al., shows another type of wheelchair anti-tipping device which, again, is located behind the wheelchair seat in a position inaccessible by the occupant of the seat and which also has no mechanism for extending and retracting the anti-tipping device.

U.S. Pat. No. 3,573,877, issued Apr. 6, 1971, to Burton H. Locke, teaches a wheelchair with a curb-climbing structure comprising a lifting means to be actuated by the occupant of the chair to raise the rear of the chair to a curb level after the front portion of the chair is placed on the curb.

It is, however, an object of the present invention to provide an anti-tipping device intended for use in circumstances other than when the chair is moved over an obstruction, e.g. for use when the chair is negotiating a hill or is being used in a sport, the anti-tipping device being retractable when the chair is moved over a curb or other obstruction.

BRIEF SUMMARY OF THE INVENTION

According to the present invention, there is provided a wheelchair with an anti-tipping device which includes a ground engagement member mounted for movement to and fro between a rearwardly extended operative position and a forwardly retracted inoperative position, and a horizontally extensible and retractable displacement device, operable in response to actuation of an actuating member accessible to a person seated on the seat, to displace the ground engagement member between these two positions.

Thus, the occupant of the wheelchair, while remaining seated in the wheelchair, can access and actuate the actuating member to displace the ground engagement member rearwardly from the frame into the operative position when there is a risk that the wheelchair may tip rearwardly. This operative position is preferably spaced above the ground. When the anti-tipping device is not required to be operational, the ground engagement member can be retracted forwardly relative to the frame and, preferably, into a position in which the displacement device and the ground engagement member are accommodated entirely beneath the frame and, therefore, do not form any rearward projection or obstruction from the frame.

In a preferred embodiment of the invention, the displacement device comprises a four-link linkage which can be collapsed, by use of the actuating member, to draw the ground engagement member into its inoperative position and which can also be extended, by operation of the actuating member, so as to deploy the ground engagement member into its operative position.

BRIEF DESCRIPTION OF THE DRAWINGS

The present invention will be more readily understood from the following description of a preferred embodiment thereof given, by way of example, with reference to the accompanying drawings, in which.

DESCRIPTION OF THE PREFERRED EMBODIMENT

Figure 1:
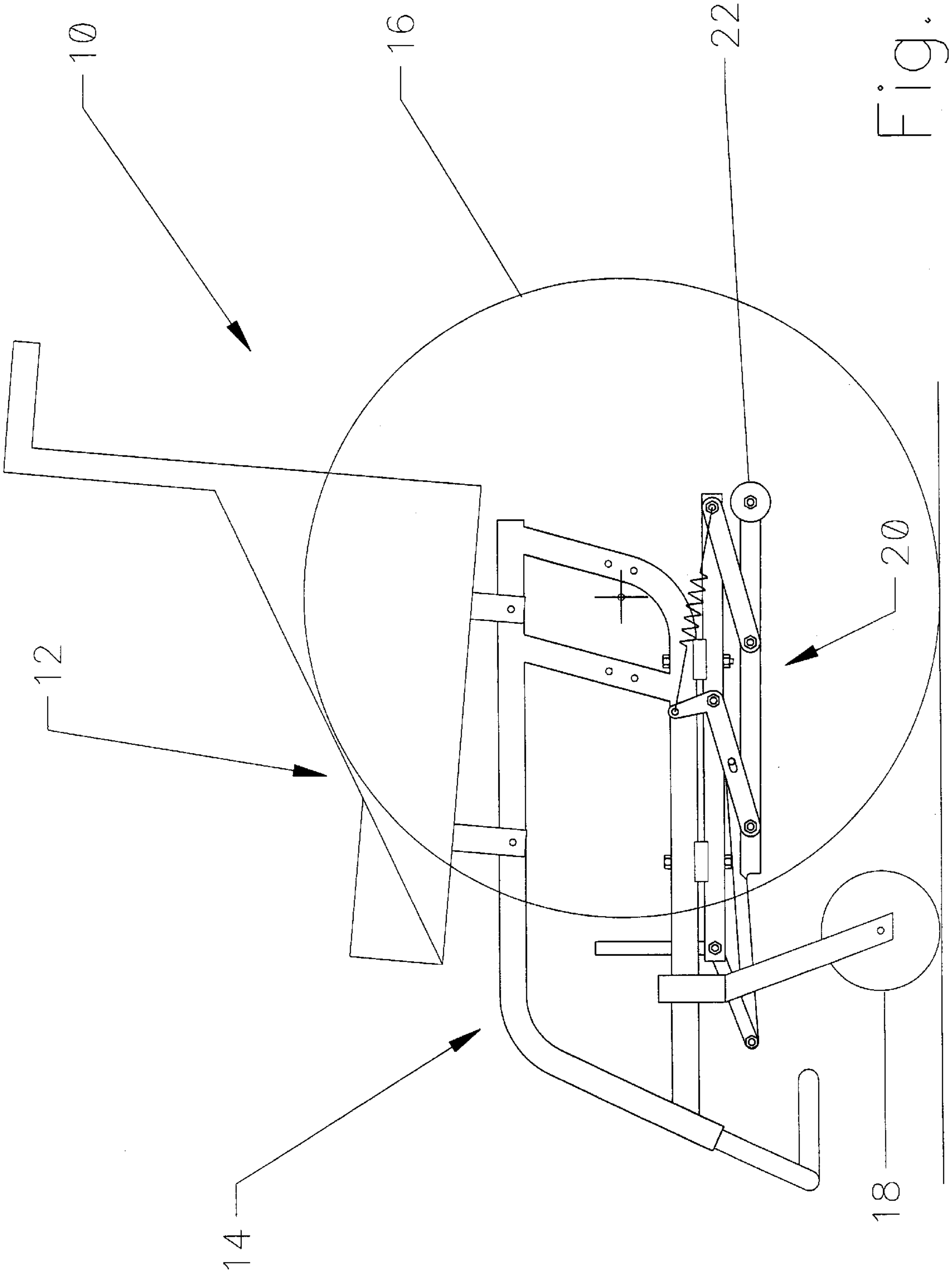
FIGS. 1 and 2 show views in side elevation of a wheelchair embodying the present invention with a pair of anti-tipping devices in a retracted inoperative positions and in an extended operative positions, respectively.
Figure 2:
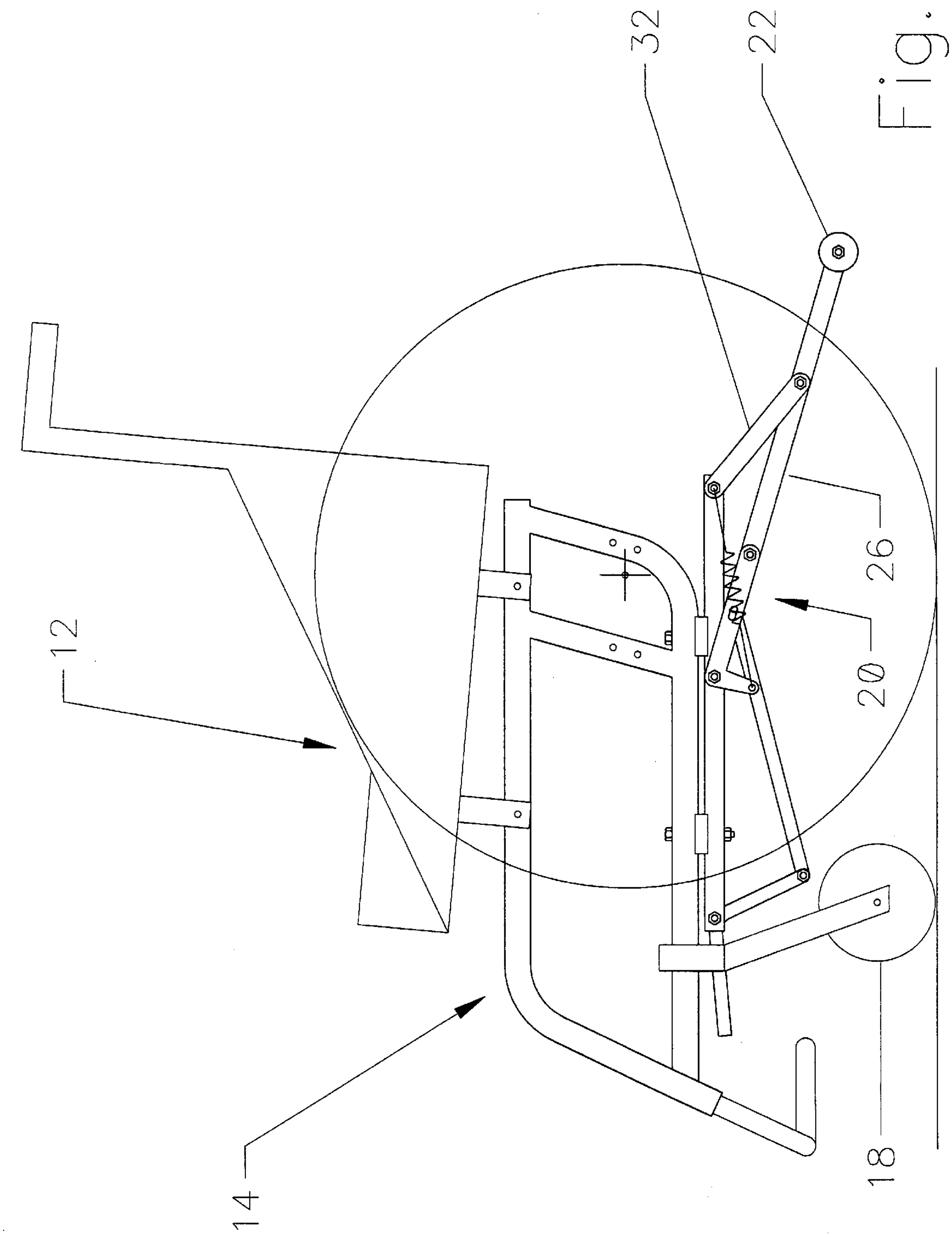

In FIGS. 1 and 2, there is shown a wheelchair indicated generally by reference numeral 10, which comprises a seat indicated generally by reference numeral 12, a frame indicated generally by reference numeral 14, a pair of side wheels 16, of which only one is shown, on opposite sides of the frame 14 and, at the front and opposite sides of the frame 14, a pair of front castors 18, of which only one is shown.

Figure 3:
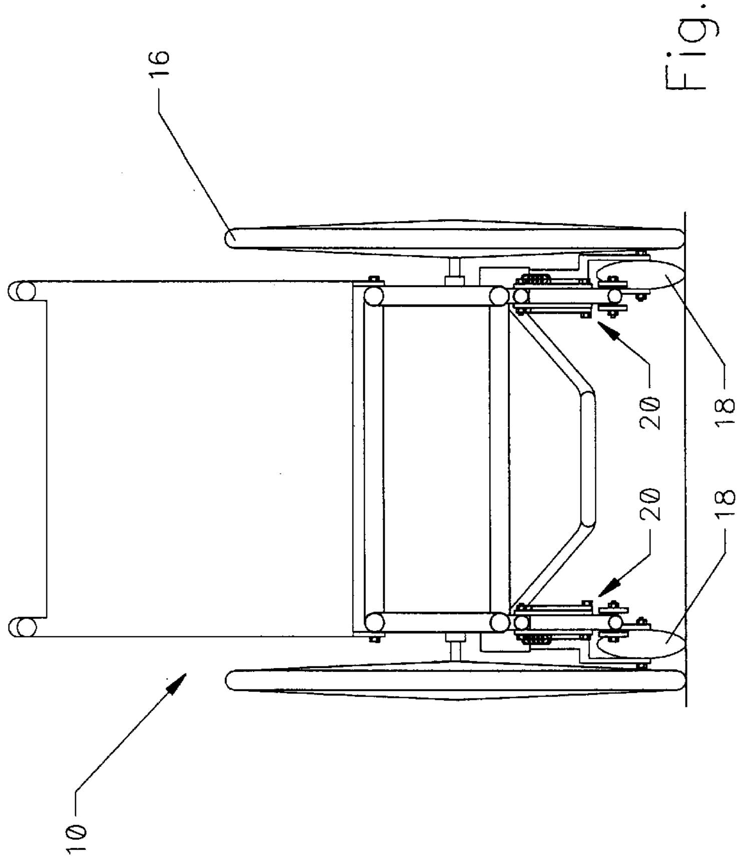
FIG. 3 shows a view in rear elevation of the wheelchair of FIGS. 1 and 2.
Figure 4:
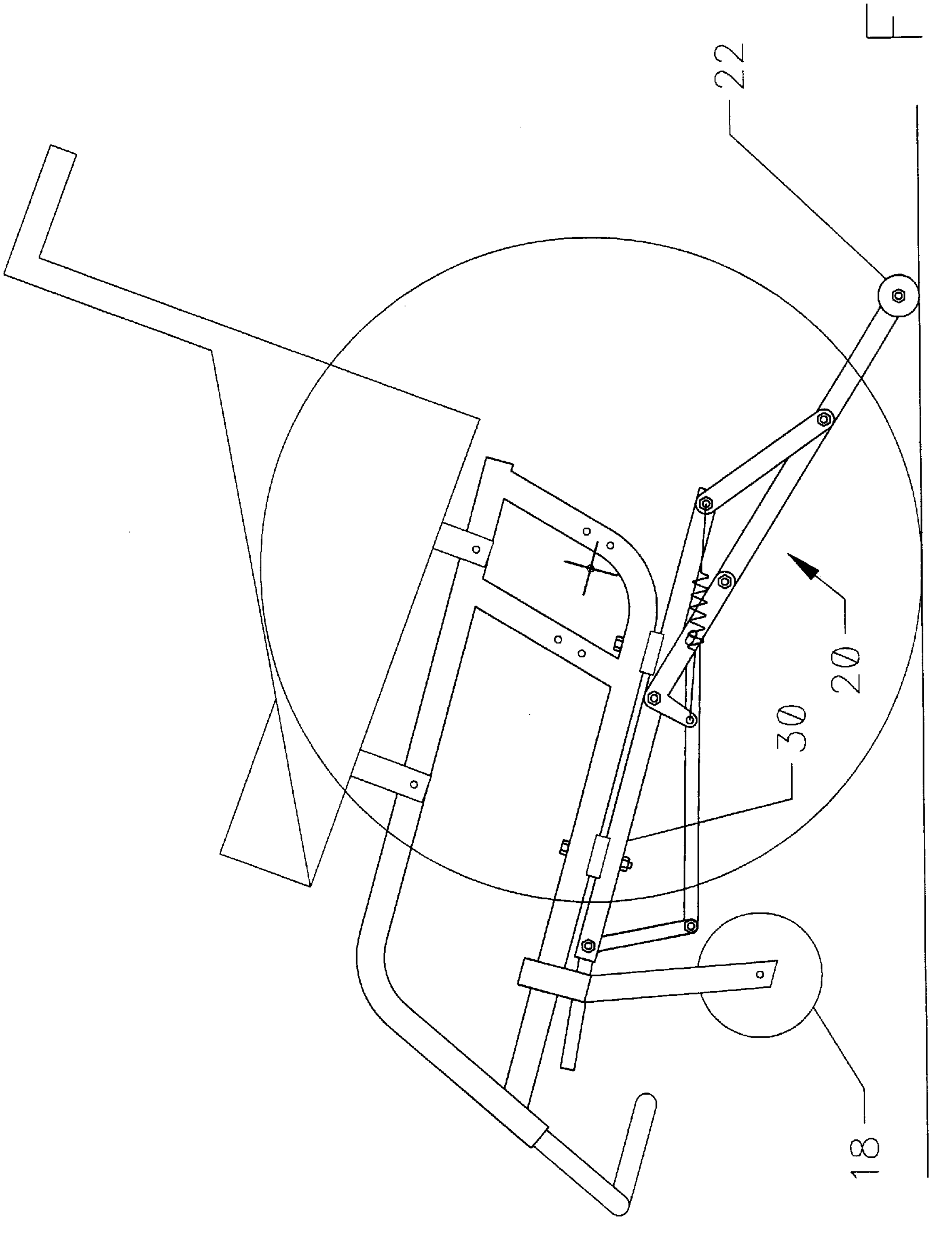
FIG. 4 shows a view of the wheelchair of FIGS. 1 to 3 with the anti-tipping devices in operation.

Beneath the frame 14, and at opposite sides of the frame 14, there are suspended a pair of anti-tipping devices, as indicated generally by reference numeral 20, one of which is shown in FIGS. 1, 2 and 4, which each include a ground engagement member in the form of a wheel 22, and both of which are shown in FIG. 3.

In FIG. 1, the anti-tipping device 20 is shown with its wheel 22 in a forwardly retracted raised inoperative condition position above ground level, in which the anti-tipping device 20 is raised above ground level and is substantially entirely located beneath the seat 12 and the frame 14 and therefore does not form any rearward projection which would obstruct a person behind the wheelchair 10, for example a person pushing the wheelchair 10.

In FIG. 2, however, the anti-tipping device 20 is illustrated deployed to locate the wheel 22 in a rearwardly extended raised position in which the wheel 22 is against above ground level and in FIG. 4 the wheelchair is tilted backwardly by an amount limited by engagement of the deployed anti-tipping device with the ground.

Figure 5:
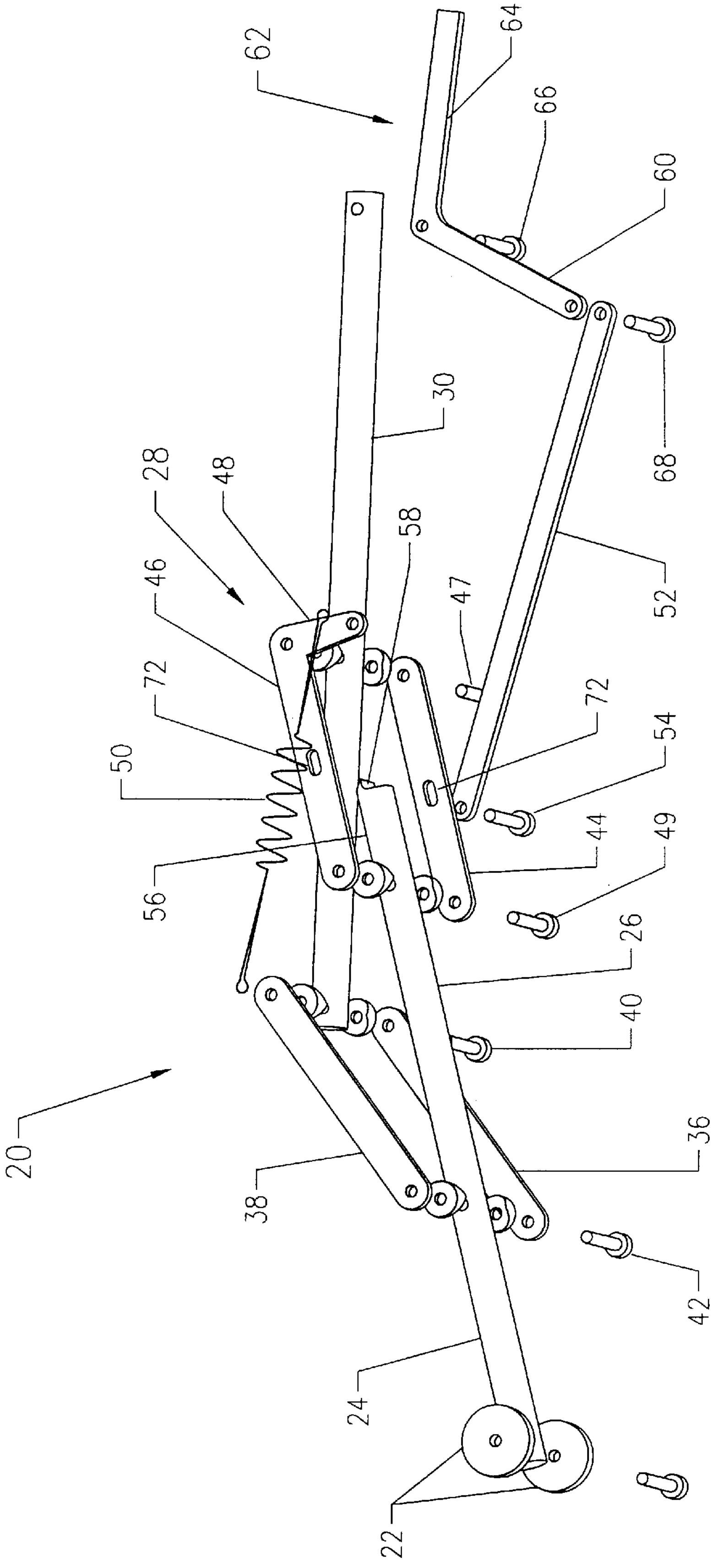
FIG. 5 shows an exploded view, in perspective, of the components of one of the anti-tipping devices of FIGS. 1 to 3.

The components of the anti-tipping device are shown in greater detail in FIG. 5.

Figure 7:
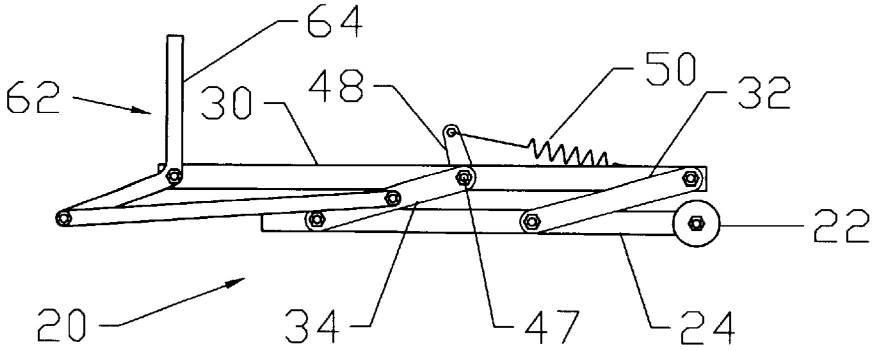
FIGS. 7, 8 and 9 show side views of one of the anti-tipping devices in three different conditions.
Figure 8:
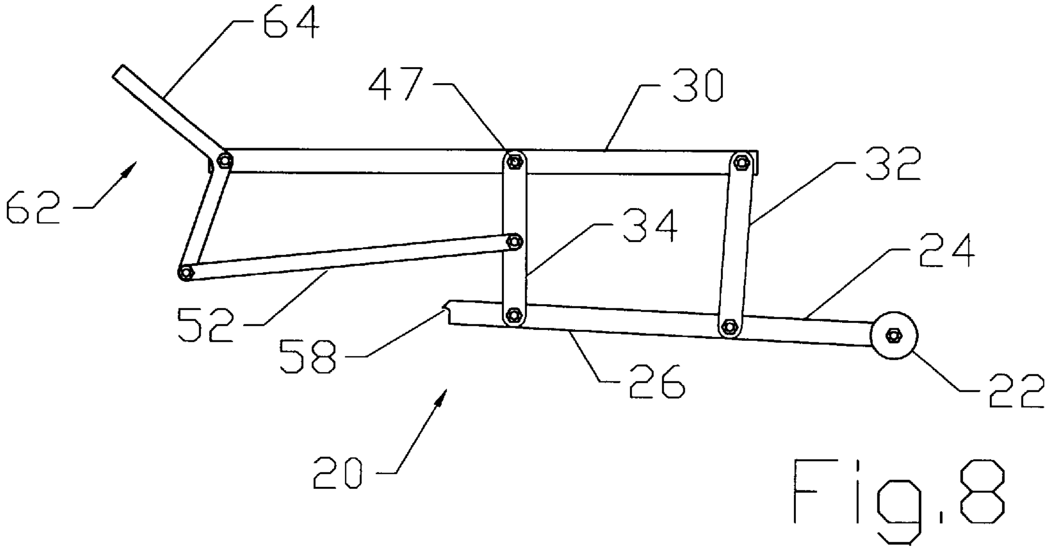
Figure 9:
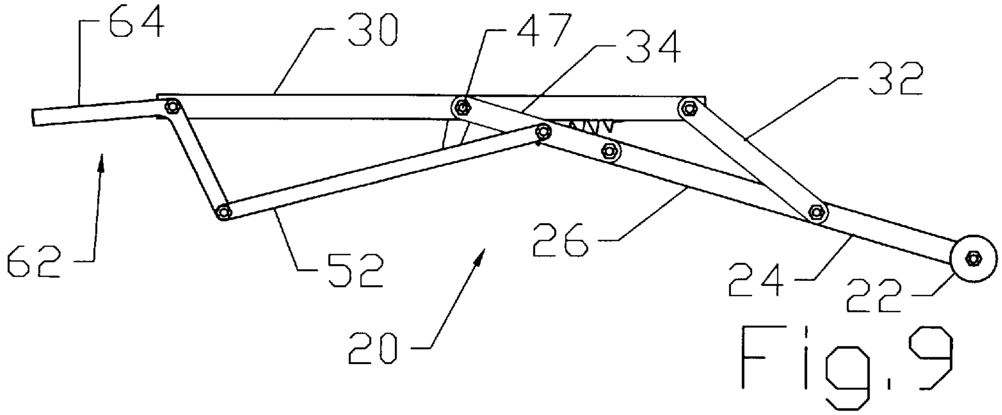

As shown in FIG. 5, the wheels 22 are rotatably secured at the rear or free end of a support comprising an arm 24, which is an extension of a link 26. The link is part of an extensible and retractable displacement device which is indicated generally by reference numeral 28 and which comprises a first link 30, in the form of a tube secured as described below to the underside of the wheelchair frame 14, the link 26 constituting a second link of the linkage, and third and fourth links 32 and 34 (FIGS. 7 through 9).

The third link 32 is formed by two parallel bars 36 and 38 (FIG. 5) which are pivotally connected at their opposite ends, by means of pivots 40 and 42, to the first link and to a tube forming the second link 26 and its extension arm 24.

The fourth link 34 is formed by a pair of bars 44 and 46 (FIG. 5), of which the bar 46 forms one arm of a double-armed lever, the other arm of which is indicated by reference numeral 48. The bars 44 and 46 are connected by pivots 47 and 49 to the first link 30 and the second link 26. The free end of the arm 48 is connected to one end of a tension spring 50, the opposite end of which is connected to the pivot 40 connecting the first and third links.

One end of a fifth link 52 is connected by a pivot 54 to the mid-points of the bars 44 and 46.

Figure 10:
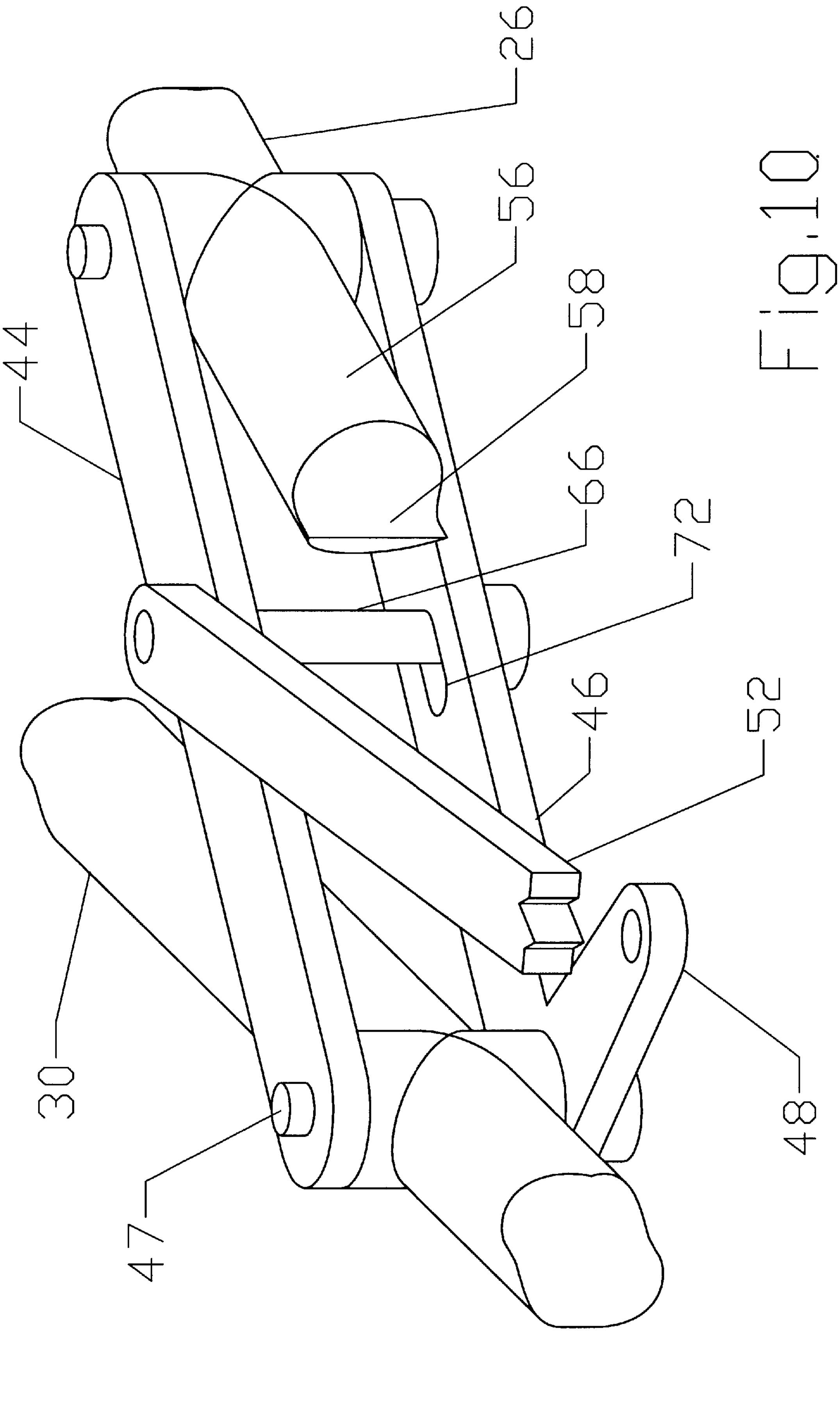
FIG. 10 shows a view in perspective of parts of one of the anti-tipping devices.
Figure 11:
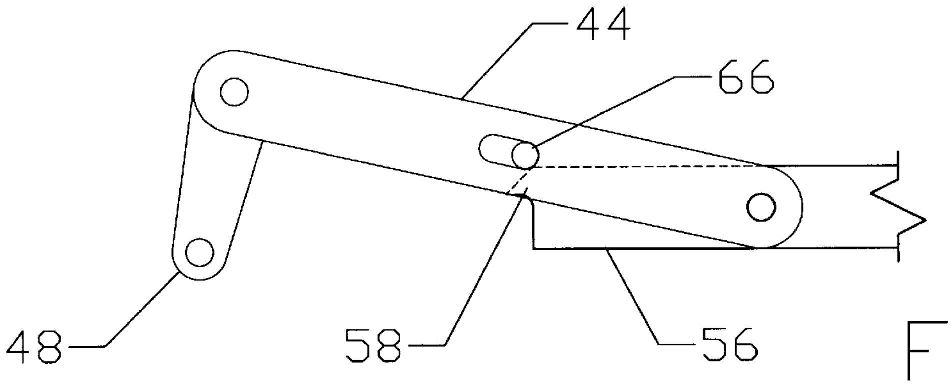
FIGS. 11, 12 and 13 show some of the parts of FIG. 9 in successive stages of a latching operation.

The second link 26, at its end opposite from the arm 24, is extended by an end portion 56 beyond the pivot 49, and the end portion 56 is formed with a catch 58 (see FIG. 10) for the purpose described in greater detail below.

The opposite end of the fifth link 52 is connected by a pivot 68 to one end of an arm 60 of a double-armed lever indicated generally by reference numeral 62, the other arm 64 of which serves as an actuating member or hand grip by means of which the occupant of the chair 10 can operate the anti-tipping device 20. The double-armed lever 62 is connected by a pivot 66 to one end of the first link 30.

Figure 6:
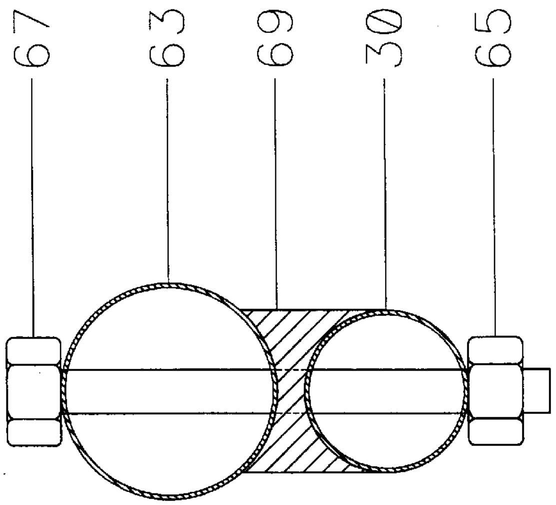
FIG. 6 shows a view taken in vertical cross-section through a connection between one of the anti-tipping devices and a frame of the wheelchair of FIGS. 1 to 3.

FIG. 6 shows a connection between the link 30 and a tube 63 which forms part of the frame 14 of the wheelchair 10. As shown in FIG. 6, a nut 65 and a bolt 67 extend through the link 30 and the tube 63, and also through a washer 69 which is interposed between and shaped to conform to the link 30 and the tube 63. This connection is one of a pair of similar connections between the link 30 and the tube 63, in the present embodiment of the invention.

Figure 14:
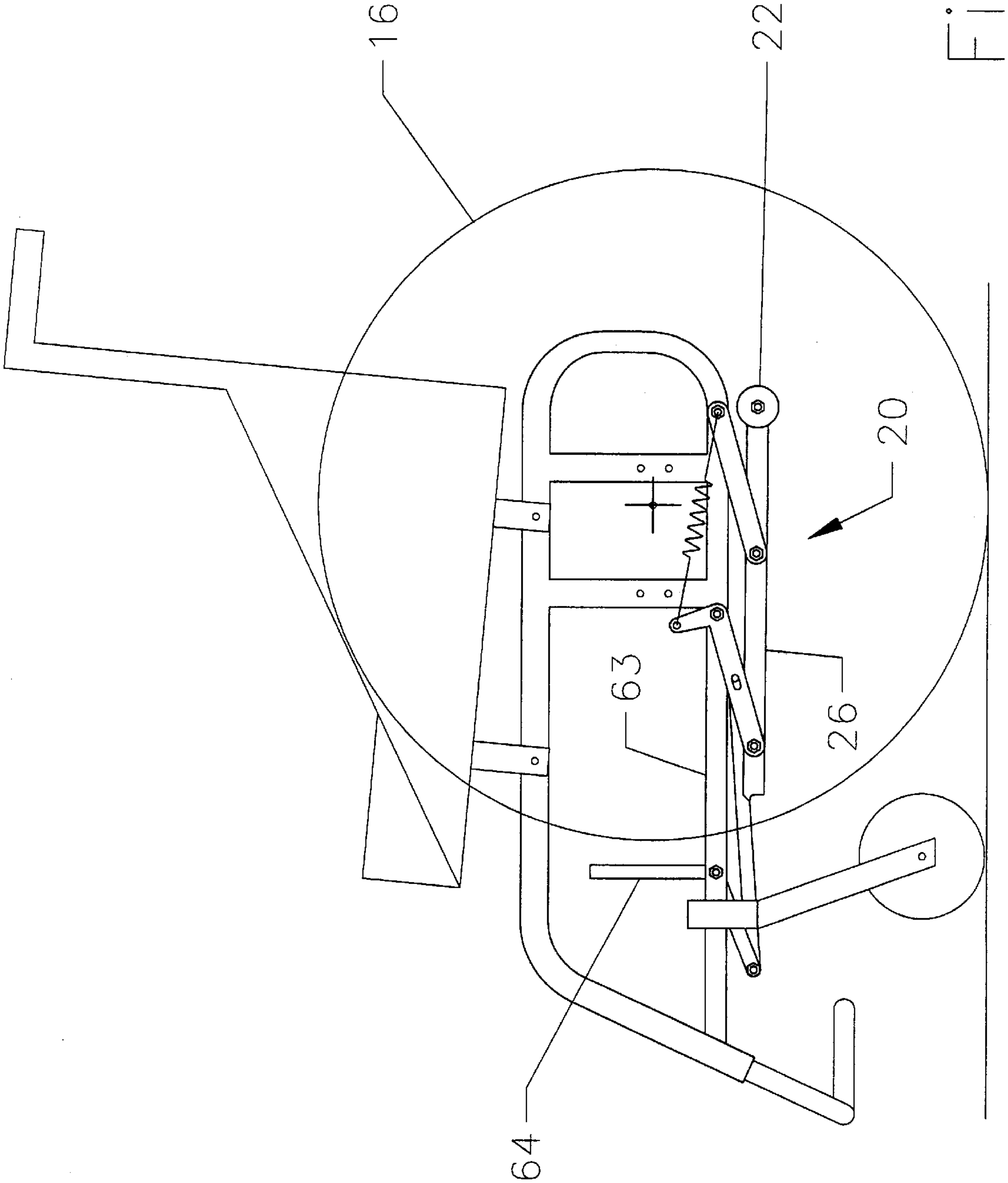
FIG. 14 shows a view in side elevation of a modification of the wheelchair and anti-tipping device shown in FIGS. 1 and 2.

In an alternative embodiment of the invention shown in FIG. 14, the tube 63 acts as the first link of the linkage, the link 30 being omitted.

The operation of this anti-tipping device will be apparent from consideration of FIGS. 7 through 9.

FIG. 7 shows the linkage in a collapsed condition, in which the arm 24 and the wheels 22 are retracted under the action of the tension spring 50 into their retracted or inoperative positions, in which they are located substantially entirely beneath the frame 14 of the wheelchair 10 as shown in FIG. 1.

By gripping the arm 64 of the lever 62, and by rotating the lever 62 in an anti-clockwise direction, as viewed in FIGS. 7 through 9, the linkage can be erected from its collapsed condition, as shown in FIG. 7, and thus rearwardly extended, through an intermediate condition, shown in FIG. 8, to an extended condition, shown in FIG. 9, in which the arm 24 and the wheels 22 are located in their rearwardly extended operative position as shown in FIG. 2.

Between the collapsed condition of FIG. 7 and the intermediate condition of FIG. 8, the spring 50 acts in tension so as to urge the linkage back into its collapsed condition shown in FIG. 7. As, however, the linkage passes through the intermediate condition of FIG. 8, and the line of action of the spring 50 thus passes below the pivot, the spring 50 tends to rotate the double-armed lever 62 in an anti-clockwise direction and, thus, tends to urge the linkage from its intermediate condition shown in FIG. 8 into its rearwardly extended or deployed condition, shown in FIG. 9.

In the extended condition shown in FIG. 9, the second link 26 is longitudinally aligned with fourth link 34, i.e. the bars 44 and 46, and is releasibly retained in this position by means of a latch mechanism indicated generally by reference numeral 70 in FIGS. 10 through 13.

Figure 12:
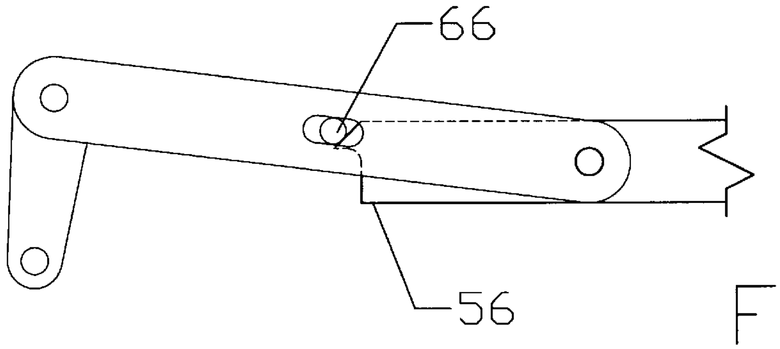
Figure 13:
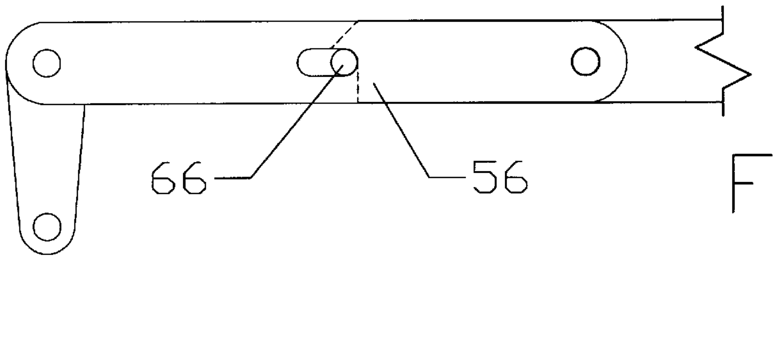

More particularly, the bars 44 and 46 forming the fourth link 34 are each formed with a longitudinally extending slot 72, and the pivot pin 54 is slidable to and fro along these slots 72. As the second link 26 moves into alignment with the fourth link 34, the catch 58 engages the pivot pin 54 and displaces it along the slots 72 as illustrated in FIG. 12, until the tip of the catch 58 passes the pivot pin 54, whereupon the pivot pin 54 falls, under gravity, into engagement with the catch 58 as shown in FIG. 13. If required, a spring (not shown) may be added to urge the pivot pin 54 into engagement with the catch 58.

When the occupant of the wheelchair 10 subsequently wishes to retract the anti-tipping mechanism 20, he or she pivots the double-armed lever 62 in a clockwise direction from the position shown in FIG. 9. This causes the fifth link 52 to move the pivot pin 54 along the slots 72 so as to release the catch 58 from engagement with the pivot pin 54. The links 26 and 34 can then pivot relative to one another from the positions shown in FIG. 13 to those shown in FIG. 11, and the linkage can then be retracted through the intermediate condition shown in FIG. 8 to the collapsed condition shown in FIG. 7.

As will be apparent to those skilled in the art, various modifications may be made in the above-described embodiment within the scope of the appended claims.

I claim:

1. A wheelchair, comprising:

a frame;

a pair of side wheels supporting said frame;

a seat on said frame; and at least one anti-tipping device on said frame;

said anti-tipping device comprising a ground engagement member movable to and fro between a rearwardly extended operative raised position and raised above ground level, in which said ground engagement member is extended rearwardly from said frame, and an inoperative forwardly retracted raised position, in which said ground engagement member is retracted forwardly relative to said frame and raised above ground level; an actuating member accessible to a person seated on said seat and an expansible and retractable displacement device connected between said actuating member and said ground engagement member and operable to displace said ground engagement member between said rearwardly extended operative raised position and said forwardly retracted inoperative raised position in response to actuation of said actuating member; and said displacement device comprising four-lever linkage.

2. A wheelchair as claimed in claim 1, wherein said displacement device comprises a linkage comprising a first link fixed relative to said frame, a second link displaceable to and fro relative to said first link, and third and fourth links with pivot connections between each of said third and fourth links and each of said first and second links, said support comprising a rearward extension of said second link.

3. A wheelchair as claimed in claim 2, further comprising a spring acting on said linkage and biasing said linkage towards a collapsed condition, in which said support and said ground engagement member are located in said retracted inoperative position, until the latter are extended rearwardly by a predetermined amount, and thereafter biasing said linkage towards an extended condition, in which said support and said ground engagement member are located in said extended operative position.

4. A wheelchair as claimed in claim 3, further comprising a latch mechanism between said second and third links for retaining said linkage in said extended condition.

5. A wheelchair as claimed in claim 4, further comprising a fifth link connected between said actuating member and said third link, said latch mechanism comprising a pin on said fifth link and a catch on said second link, said catch being engageable with said pin on displacement of said support and said ground engagement member into the operative position.

6. A wheelchair, comprising:

a frame;

a pair of side wheels supporting said frame;

a seat on said frame; and at least one anti-tipping device on said frame;

said anti-tipping device comprising a ground engagement member movable to and fro between a rearwardly extended operative raised position, in which said ground engagement member is extended rearwardly from said frame and raised above ground level, a latch mechanism for releasability retaining said ground engagement member in said rearwardly extended operative raised position, and an inoperative forwardly retracted raised position, in which said ground engagement member is retracted forwardly relative to said frame and raised above ground level; an actuating member accessible to a person seated on said seat and an expansible and retractable displacement device connected between said actuating member and said ground engagement member and operable to displace said ground engagement member between said rearwardly extended operative raised position and said forwardly retracted inoperative raised position in response to actuation of said actuating member.

7. A wheel chair as claimed in claim 6, wherein said displacement device comprises a lever linkage.

8. A wheelchair as claimed in claim 6, including a spring urging said ground engagement member from said rearwardly extended operative raised position to said inoperative forwardly retracted position.

* * * * *